(12) United States Patent
Klein

(10) Patent No.: US 7,515,053 B2
(45) Date of Patent: Apr. 7, 2009

(54) IDENTIFICATION BAND

(76) Inventor: Hannah Clair Klein, 1516 Columbus Ave., Burlingame, CA (US) 94010

( * ) Notice: Subject to any disclaimer, the term of this patent is extended or adjusted under 35 U.S.C. 154(b) by 229 days.

(21) Appl. No.: 11/411,585

(22) Filed: Apr. 25, 2006

(65) Prior Publication Data
US 2006/0261958 A1 Nov. 23, 2006

Related U.S. Application Data

(60) Provisional application No. 60/674,804, filed on Apr. 25, 2005.

(51) Int. Cl.
*G08B 13/14* (2006.01)
(52) U.S. Cl. .................. 340/572.8; 340/572.1; 340/571
(58) Field of Classification Search ............. 340/572.8, 340/572.9, 572.7, 572.1, 571, 568.1, 568.4, 340/539.11, 573.1, 573.4; 235/380, 385; 40/633
See application file for complete search history.

(56) References Cited

U.S. PATENT DOCUMENTS

| | | | | |
|---|---|---|---|---|
| 5,499,468 A * | 3/1996 | Henry | ................ | 40/633 |
| 5,742,233 A | 4/1998 | Hoffman et al. | | |
| 6,155,409 A | 12/2000 | Hettinger | | |
| 6,239,700 B1 | 5/2001 | Hoffman et al. | | |
| 6,624,754 B1 | 9/2003 | Hoffman et al. | | |
| 6,836,215 B1 * | 12/2004 | Laurash et al. | ........... | 340/572.1 |
| 6,944,985 B2 | 9/2005 | Fishman | | |
| 7,198,190 B2 * | 4/2007 | Juhan et al. | .............. | 235/380 |
| 7,293,383 B2 * | 11/2007 | Fishman et al. | .............. | 40/633 |
| 2003/0174049 A1 | 9/2003 | Beigel et al. | | |
| 2004/0093897 A1 | 5/2004 | Weissbuch | | |
| 2004/0140898 A1 | 7/2004 | Reeves | | |
| 2004/0260470 A1 * | 12/2004 | Rast | ............. | 701/300 |
| 2005/0005491 A1 | 1/2005 | Fishman | | |
| 2005/0108912 A1 * | 5/2005 | Bekker | ............. | 40/633 |
| 2005/0115122 A1 | 6/2005 | Fishman et al. | | |
| 2005/0184874 A1 * | 8/2005 | Mosher, Jr. | .............. | 340/572.8 |
| 2005/0242137 A1 | 11/2005 | Fishman et al. | | |

OTHER PUBLICATIONS

"Imation—Flash Wristband", Imation, pp. 1-2, Apr. 25, 2006 <http://www.imation.com/products/flash_devices/usb_flash_wristband.html>.
Helliker, Kevin, "Low-Tech Lifesavers: Medical Bracelets Are an Underused but Crucial ER Tool," Wall Street Journal, Apr. 5, 2005, 2 pages.
Stein, Rob, "Bar code implant calls up medical data," San Francisco Chronicle, 2 pages, Year 140, vol. 272, San Francisco, California, USA. , 2006.

* cited by examiner

*Primary Examiner*—Van T. Trieu
(74) *Attorney, Agent, or Firm*—Nixon Peabody LLP; Jennifer Hayes

(57) ABSTRACT

Updateable, customizable identification bands are disclosed herein. The identification band may include a band having an opening therein and at least one transparent surface. An information tag is insertable into the opening and is visible through the at least one transparent surface. The information tag is updateable, customizable or replaceable. The identification band may include accessible digital data storage as well. The identification band may also include a clasp. The clasp may include a male part and a female part, the female part having a cave-like opening that enables the information tag to be inserted into the opening in the band. The male part desirably secures the 'cave-like" opening such that a water tight seal is formed. The clasp may include digital storage capability, technology and/or a power source.

23 Claims, 13 Drawing Sheets

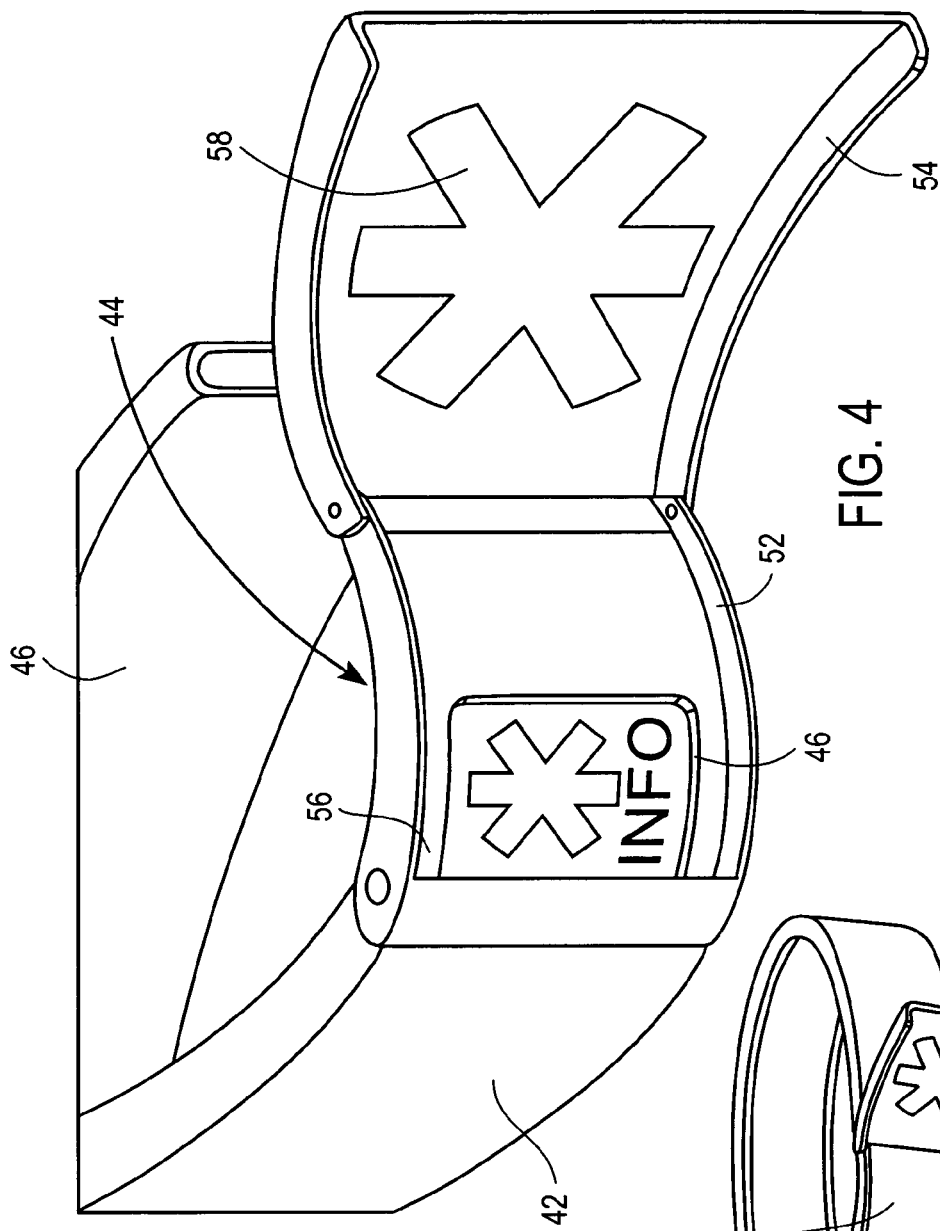
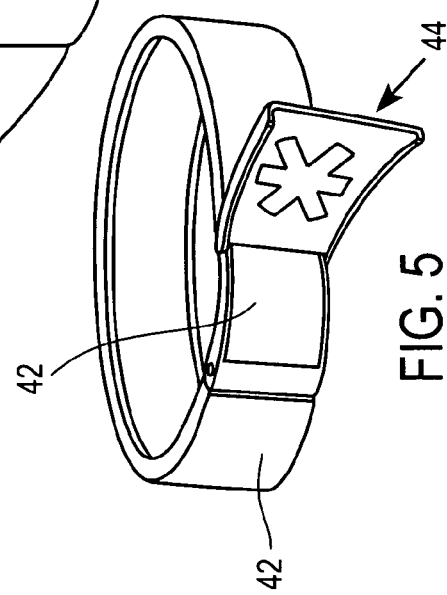
FIG. 4
FIG. 5

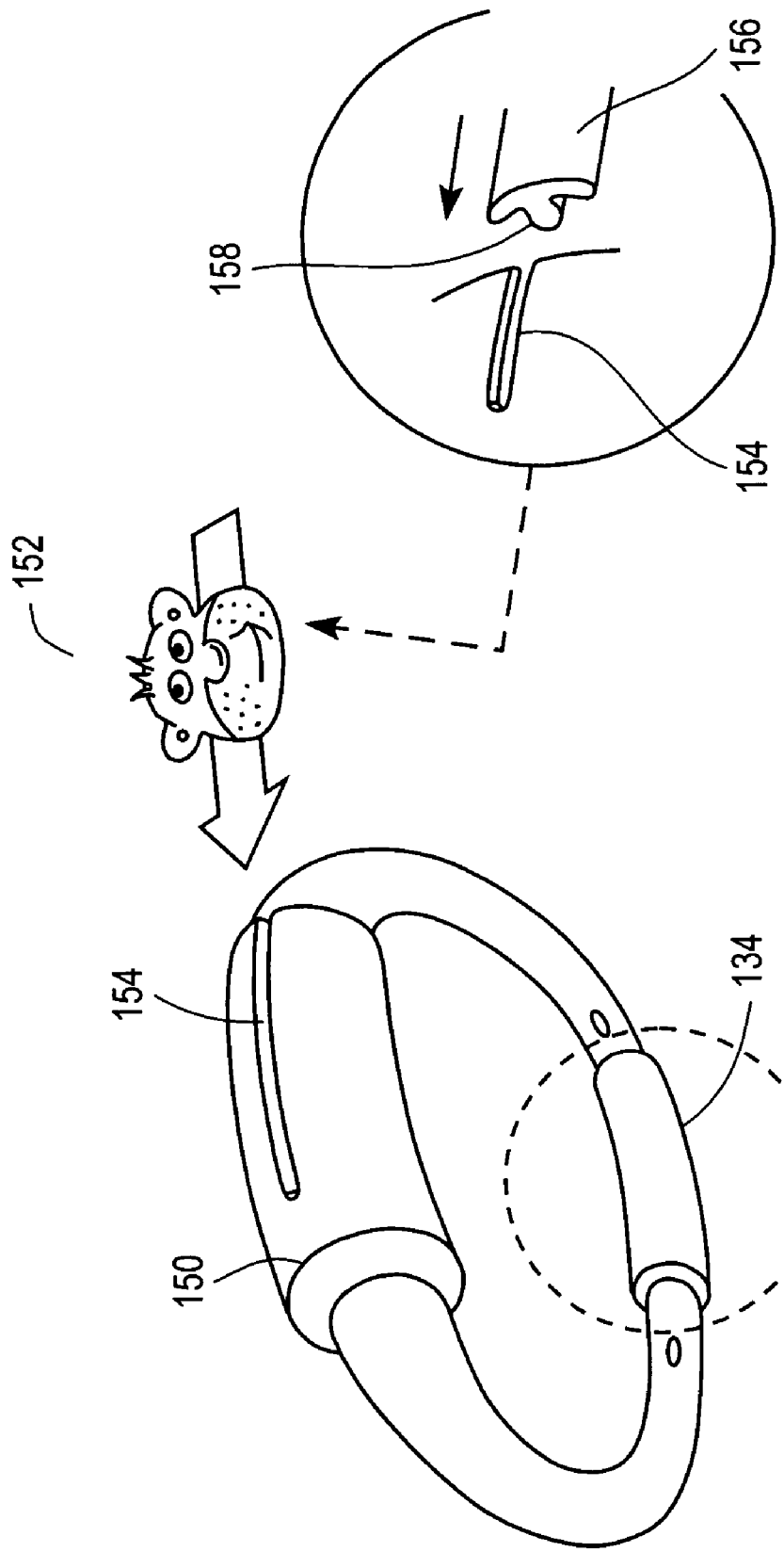

SNAP-ON ACCESSORIES

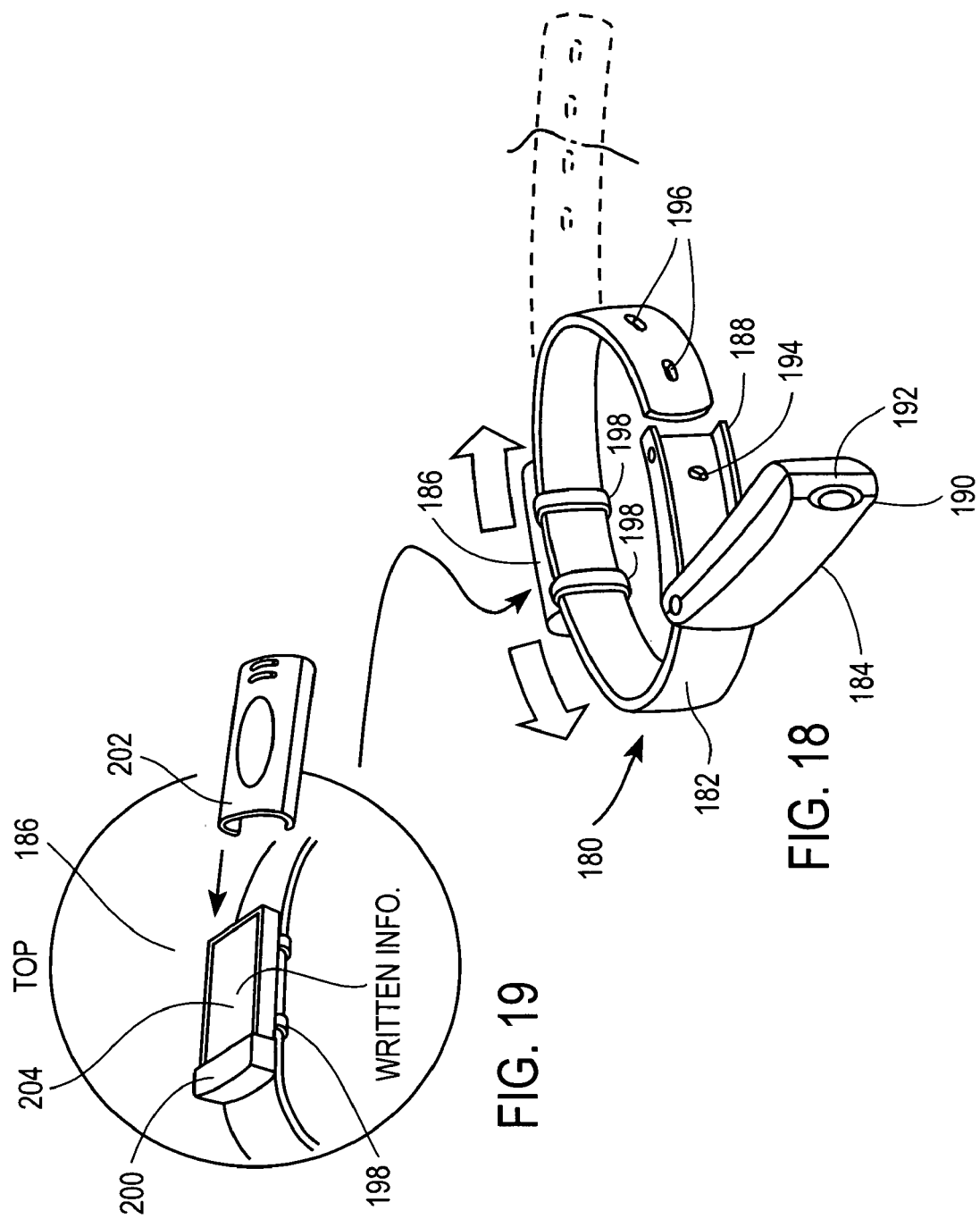

IDENTIFICATION BAND

CROSS-REFERENCE TO RELATED APPLICATIONS

This application claims the benefit of U.S. Provisional Patent Application No. 60/674,804, filed on Apr. 25, 2005, and entitled, "Wearable Identification Band Including Graphic And Wearer Information", which is incorporated herein by reference.

FIELD

Embodiments of the present invention relate to the field of identification bands and, in particular, to a wearable, updateable, customizable information source.

BACKGROUND

Identification bracelets are used to alert others of medical conditions and personal data. These medical emergency bracelets are typically metallic bands worn around a user's wrist. The medical emergency information relating to the medical conditions is engraved in the bracelet. The engraving typically includes symbols or minimal information relating to the medical condition.

However, the bracelets are not updateable, customizable or embedded with technology. The bracelets do not allow the caregiver or wearer to personally create information that is stored and accessible via. the bracelet.

Further, the bracelets do not vary. The same style of bracelet is worn by young children, teens, adults and the elderly. The bracelets are not fashionable or comfortable. In addition, the bracelets are not child-friendly.

SUMMARY

An identification band is disclosed herein. The identification band includes a band having an opening therein, at least one surface of the band being transparent; a closure device having a first part and a second part, the first part having an opening corresponding to the opening of the band, the first part being coupled to a first end of the band and the second part being coupled to a second end of the band, the first part and the second part being engageable with one another to secure the first end of the band with the second end of the band; and an information tag insertable into the opening of the band through the opening in the first part of the closure device, the information tag being visible through the transparent surface of the band.

The information tag may be a strip of paper, plastic or other materials.

The identification element may also include a digital data storage element.

The closure device may include one or more o-rings to ensure a water-tight seal.

The first part and the second part of the closure device may form a water-tight seal.

The closure device may also include a medication holder.

The closure device may be water-resistant.

The closure device may also include a USB port (mini or otherwise) wireless and location technology as well as power supply for accessing information.

The information tag may be replaceable.

Another identification band is also disclosed herein. The identification band includes a band securable to a wearer; and a digital data storage element coupled with the band to provide digital data about the wearer of the band.

The band may include an opening therein and the identification band may include an information tag insertable into the band to provide data about the wearer of the band.

The digital data storage element may be an RFID chip (and an antennae for range). The digital data storage element may be flash memory or other forms of digital or analog storage.

The band may also include a USB port for accessing the digital data.

The band may also include a closure device coupled to the band.

The band may be an LED display.

The digital data storage element may be coupled to the closure device.

A kit is also disclosed herein. The kit includes an identification tag; and an identification band securable to a wearer, the identification band comprising a band having an opening for receiving the information tag, at least one surface of the band being transparent such that the information tag is visible through the at least one surface of the band upon insertion.

The information tag may be a strip of paper sized to fit within the identification band.

The information tag may include a plurality of strips of paper.

The information tag may be a roll of paper, the width of the roll of paper sized to fit within the identification band.

BRIEF DESCRIPTION OF THE DRAWINGS

The invention is described by way of example with reference to the accompanying drawings, wherein:

FIG. 4 is a detailed perspective view of the clasp of the identification band of FIG. 3 in accordance with one embodiment of the invention;

FIG. 5 is a detailed perspective view of the clasp of the identification band of FIG. 3 in accordance with one embodiment of the invention;

Figure 12:
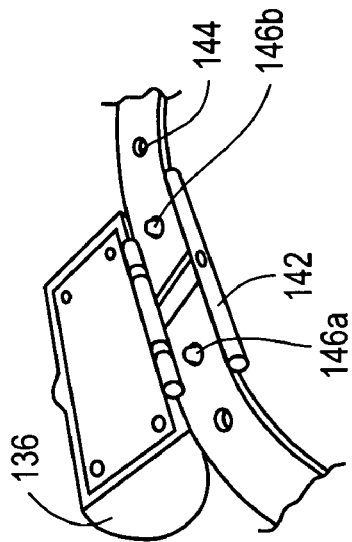
Figure 13:
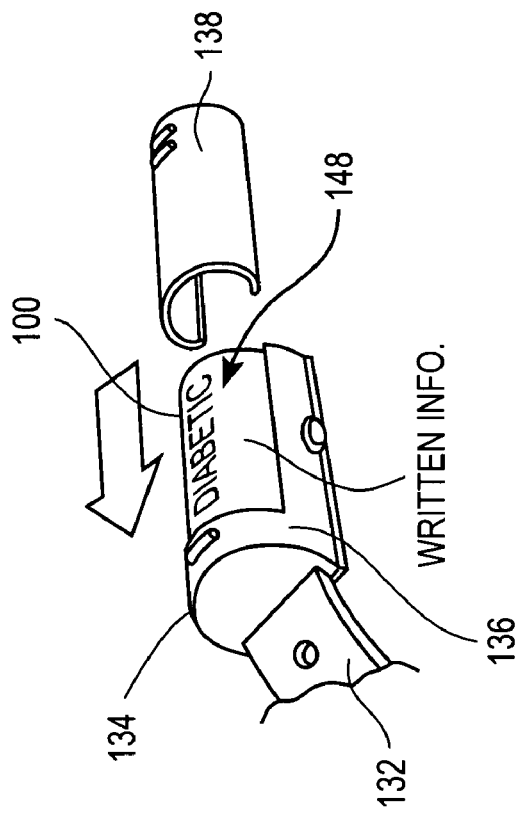
Figure 11:
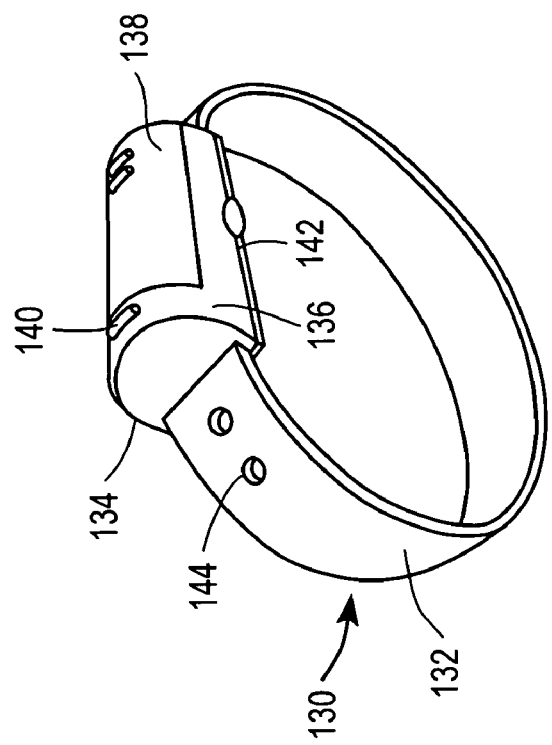
Figure 16:
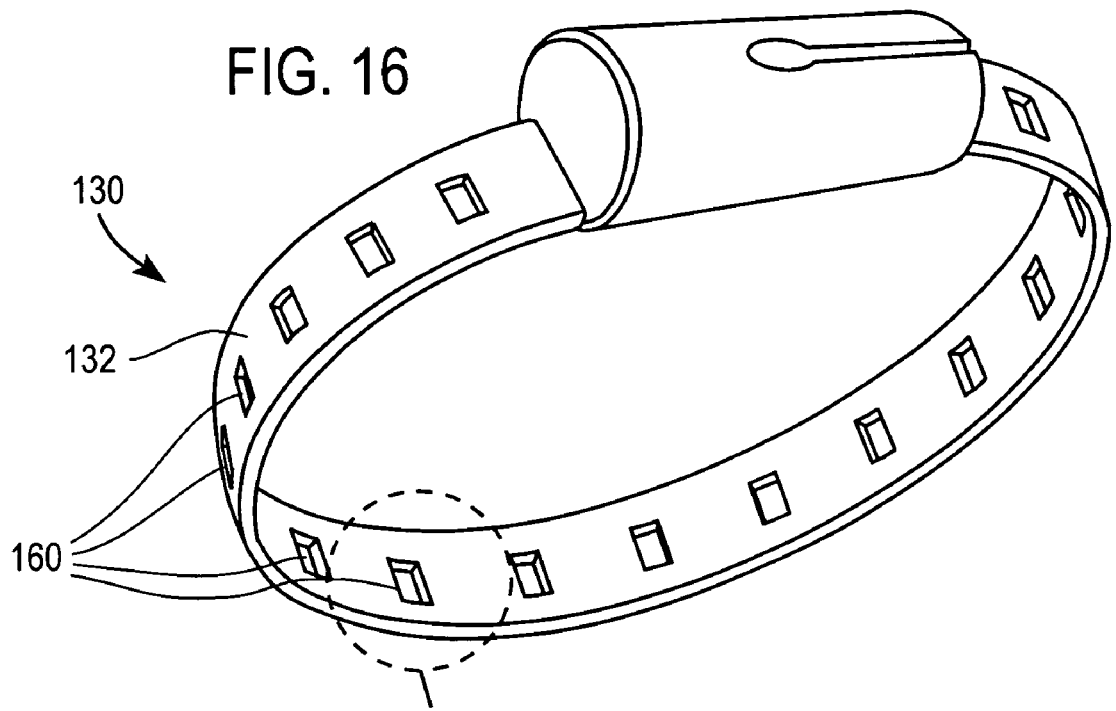
Figure 17:
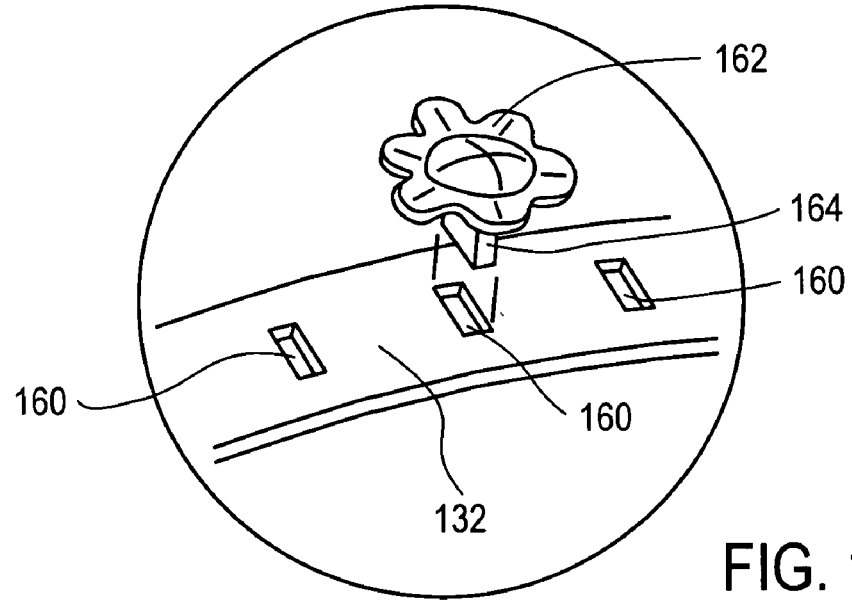

FIG. /11 is a perspective view of an identification band in accordance with one embodiment of the invention;

FIG. 12 is a detailed view of the clasp of the identification band of FIG. 11 in accordance with one embodiment of the invention;

FIG. 13 is a detailed view of the information storage area of the identification band of FIG. 11 in accordance with one embodiment of the invention;

FIG. 14 is a perspective view of the identification band of FIG. 11 having a decorative feature in accordance with one embodiment of the invention;

FIG. 15 is a detailed view of an attachment element for the decorative feature for use with the identification band of FIG. 11 in accordance with one embodiment of the invention;

FIG. 16 is a perspective view of the identification band of FIG. 11 for use with a decorative feature in accordance with one embodiment of the invention;

FIG. 17 is a detailed perspective view of the decorative feature attached to the identification band of FIG. 16 in accordance with one embodiment of the invention;

FIG. 18 is a perspective view of an identification band in accordance with one embodiment of the invention; and FIG. 19 is a detailed perspective view of an information storage element of the identification band of FIG. 18 in accordance with one embodiment of the invention.

DETAILED DESCRIPTION

Figure 1:
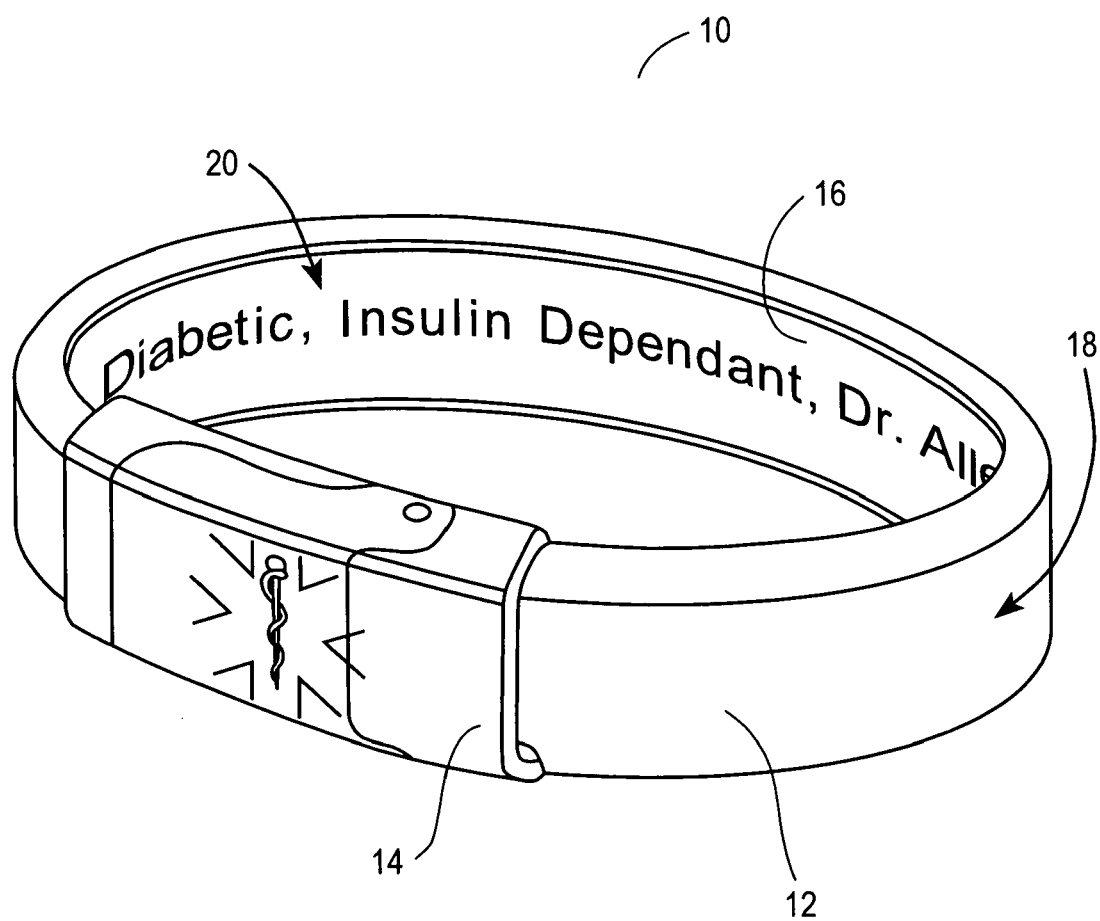
FIG. 1 is a perspective view of an identification band in accordance with one embodiment of the invention.

FIG. 1, of the accompanying drawings, shows an identification band 10 in accordance with one embodiment of the invention. The identification band 10 includes a band 12, a closure device 14 and an information tag 16. The band 12 includes an outer surface 18 and an inner surface 20, and an opening (not shown) throughout the band 12.

A least one of the outer or inner surfaces 18 or 20 is transparent. The entire band 12 may be transparent. The band 12 may be adjustable or sized to fit the wearer. The band 12 may be made of any material practical for the intended uses of the device. Exemplary materials include plastics (PVC, elastomer, synperene, silicon, polyethylene, nylon, polyolefin, polymer), fabrics, leather, and combinations thereof. The band may be formed from a single piece of material or a combination of multiple pieces.

The opening of the band, which may also be referred to as a cave, allows for ease of insertion of the information tag 16. The information tag 16 is visible through the transparent surface(s) of the band when inserted.

The information tag 16 is sized to fit within the band 12. Information about the wearer of the band is written or typed onto the information tag 16. The information tag 16 is desirably water-resistant or, more desirably, water-proof, and is capable of being inserted into the band. The information tag 16 may be a slip of paper or another type material, such as, for example, plastic, tyvek or the like.

The medical information may be emergency medical information, such as the wearer's medical conditions, emergency phone numbers, personal information, contact information and the like. The information tag 16 may also include a bar code, RFID, or other similar technology, to allow access to digital data about the wearer, as will be described hereinafter.

The closure device 14 may be a clasp.

Figure 2:
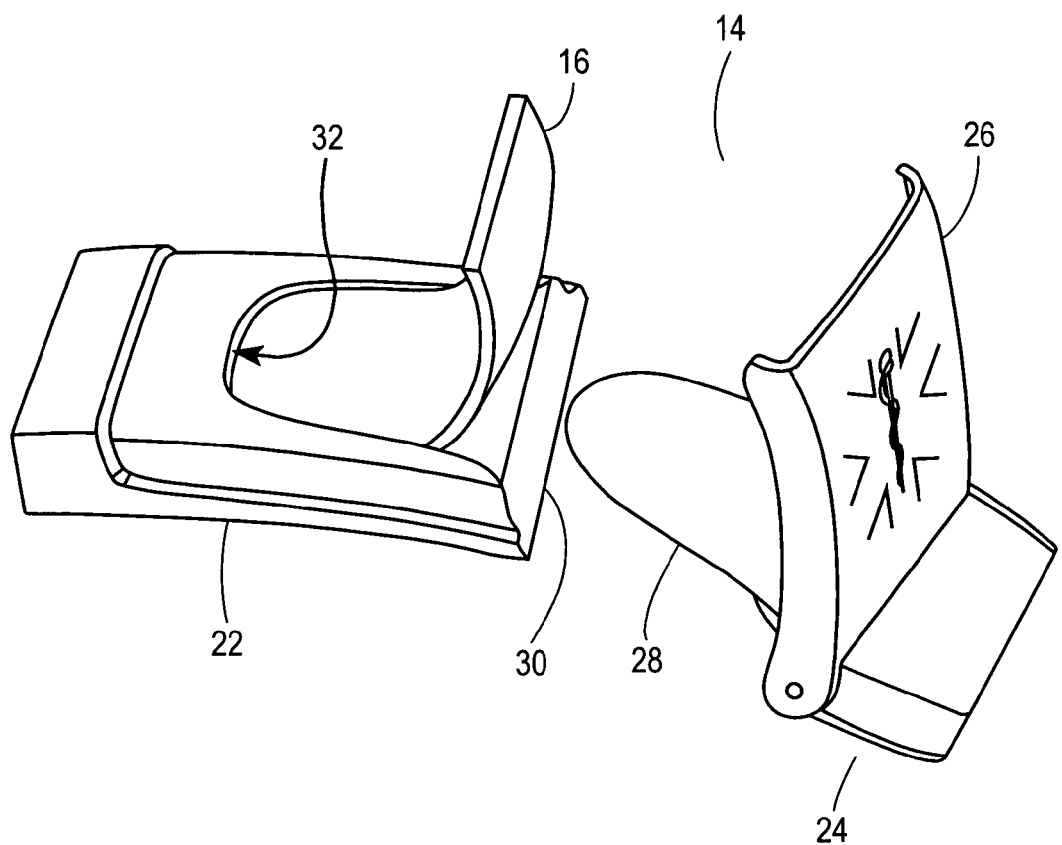
FIG. 2 is a detailed perspective view of the clasp of the identification band of FIG. 1 in accordance with one embodiment of the invention.

FIG. 2 shows the closure device 14 in more detail. The closure device 14 includes a female closure element 22 and a male closure element 24. The male closure element 24 includes a movable lock 26 and a tongue 28. The female closure element 24 includes a first opening 30, corresponding to the tongue 28, and a second cave-like opening 32, for receiving the information tag 16.

The male closure element 24 is insertable into and engageable with the female closure element 22. In the illustrated embodiment, the tongue 28 of the male closure element 24 is insertable into and engageable with the first opening 30 of the female closure element 22. In one embodiment, when the tongue 28 engages with the first opening 30 a water-tight seal is formed. The movable lock 26 is movable to lock and/or release the male closure element 24 from the female closure element 22. In one embodiment, the moveable lock 28 also adds to the water-tight seal.

The ends of the band may be fixedly or adjustably sealed to the closure device 14. In one embodiment, the end of the band connected to the female part 22 is securely sealed to the female part 22, while the end of the band connectable to the male part 24 may be cut to shorten, prior to attachment with the male end 24.

It will be appreciated that the information tag 16 may also be removed from the identification band 10.

The closure device 14 may include digital data storage capabilities and/or access. The clasp may be a USB port, or contain other digital data technology, and/or a power source, as will be described hereinafter. The clasp may also have location or wireless technology as well as flash memory or other storage technology, and the band may hold a cable or other necessary components associated with the digital data storage capabilities of the band 12 or closure device 14.

In use, a wearer of the identification band 10 identifies their medical conditions and/or contact/personal information on the information tag 16. The wearer unlocks the closure device 14 by moving the lock 26 into an open position. The tongue 28 is removed from the opening 30 of the female closure element 22. The information tag 16 is inserted into the opening 32 until the information tag 16 is entirely inserted into the band. A wearer then secures the identification band 10 to their wrist. To do so, the tongue 28 is reinserted into the opening 30 and the lock 26 is moved into the closed position.

In the illustrated embodiments, the information on the information tag 16 is visible through the inner surface 16 of the band 12. A first responder can remove the identification band 10 or rotate the band 12 to access the information on the information tag 16.

Figure 3:
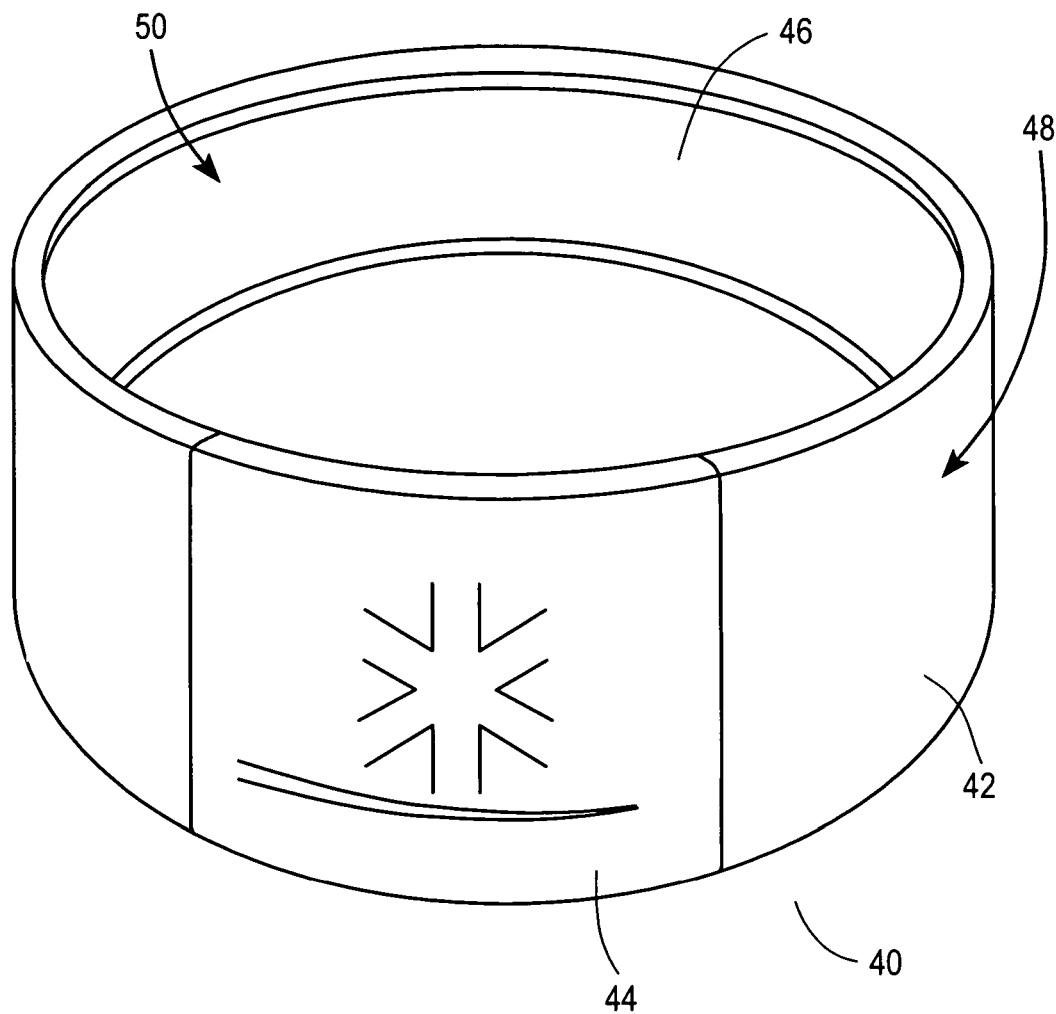
FIG. 3 is a perspective view of an identification band in accordance with one embodiment of the invention.

FIG. 3 shows an identification band 40 in accordance with one embodiment of the invention. The identification band 40 includes a band 42, a closure device 44 and an information tag 46. The band 42 includes an outer surface 48 and an inner surface 50. The band 12 includes an opening (not shown) throughout the length of the band 12.

As discussed above with reference to identification band 10 illustrated in FIGS. 1 and 2, one or more of the outer surface 48 and inner surface 50 may be transparent, and the information tag 46 is insertable into the band 42, such that information provided on the information tag 46 is visible through the one or more transparent surfaces.

FIG. 4 shows the closure device 44 in more detail. The closure device 44 includes a first receiving closure element 52 and a second, movable, locking closure element 54. The receiving closure element 52 includes an opening 56. The opening 56 corresponds to the information tag 46.

The locking closure element 54 is releasably attached to the receiving closure element 52. The locking closure element 54 and receiving closure element 52 may be friction fit together. The movable locking closure element 54 is movable to reveal the opening 56 in the receiving closure element 52. The information tag 46 is insertable into the opening 56.

A graphic 58 may be provided on the closure device 44. The graphic 58 may be a raised or debossed graphic. The graphic may be an intrinsic (monolithic) part of the closure device. The graphic may be a universal medical symbol such as the AMA logo, the codussus and/or the star of life. The symbol may or may not be alterable.

In use, a wearer of the identification band 40 identifies their medical conditions and/or contact information on the information tag 46. The wearer unlocks the closure device 44 by moving the locking closure element 54 into an open position. The information tag 46 is inserted into the opening 56 until the information tag 46 is entirely inserted into the band 42.

FIG. 5 shows the identification band 40 with the band 10 locked into the closure device 44.

A wearer secures the identification band 40 to their wrist. The band 42 is inserted through the receiving closure element 54 to lock the band into the closure device 14. The locking closure element 52 is moved into the closed position to secure the band 42 and information tag 46, desirably creating a water tight seal.

In the illustrated embodiments, the medical information is visible through the inner surface 46 of the band 42. A first responder can remove the identification band 40 or rotate the band 42 to visualize the medical information on the information tag 46.

Figure 6:
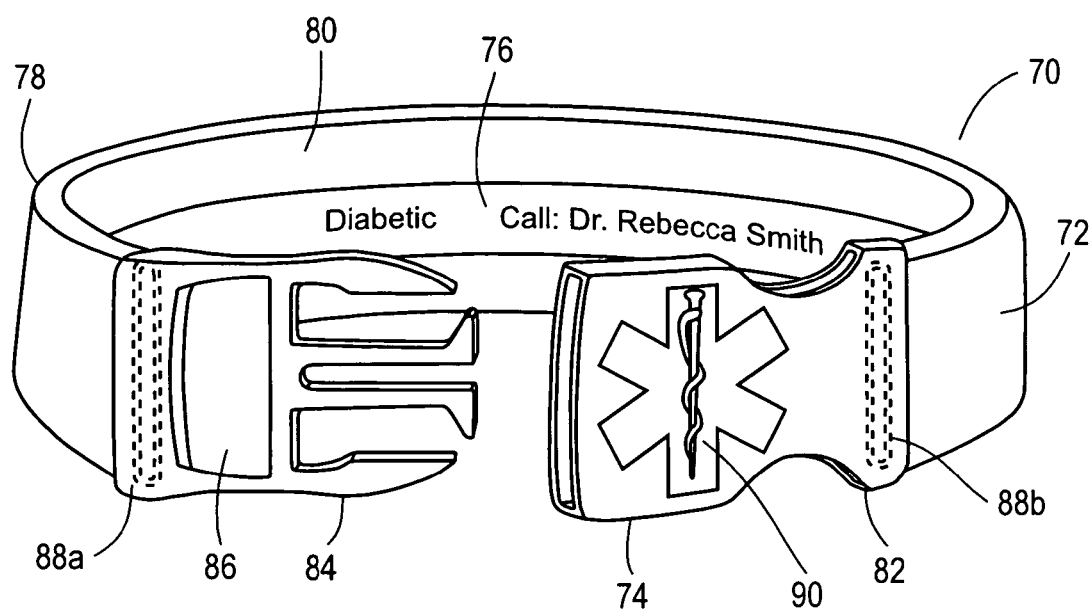
FIG. 6 is a perspective view of an identification band in accordance with one embodiment of the invention.

FIG. 6 shows an identification band 70 in accordance with one embodiment of the invention. The identification band 70 includes a band 72, a closure device 74 and an information tag 76.

The band 72 includes an outer surface 78 and an inner surface 80. As described hereinabove, one or more of the outer surface 78 and inner surface 80 may be transparent, such that information on the information tag 76 is visible through the transparent surface.

As discussed above with respect to identification band 10 of FIGS. 1 and 2, the information tag 76 is sized to fit within the band 72 and is insertable into the band 72.

The closure device 74 includes a female closure element 82 and a male closure element 84. The male closure element includes a guide 86.

One or more O-rings 88 may be provided at the interface of the band 72 and the closure device 74. A first o-ring 88*a* is shown at the interface between the band 72 and the male closure element 84. A second o-ring 88*b* is shown at the interface between the band 72 and the female closure element 82. The o-rings provide water resistance between the closure device 74 and the band 72. It will be appreciated that other water resistant elements may be used with the identification bands described herein.

Figure 6A:
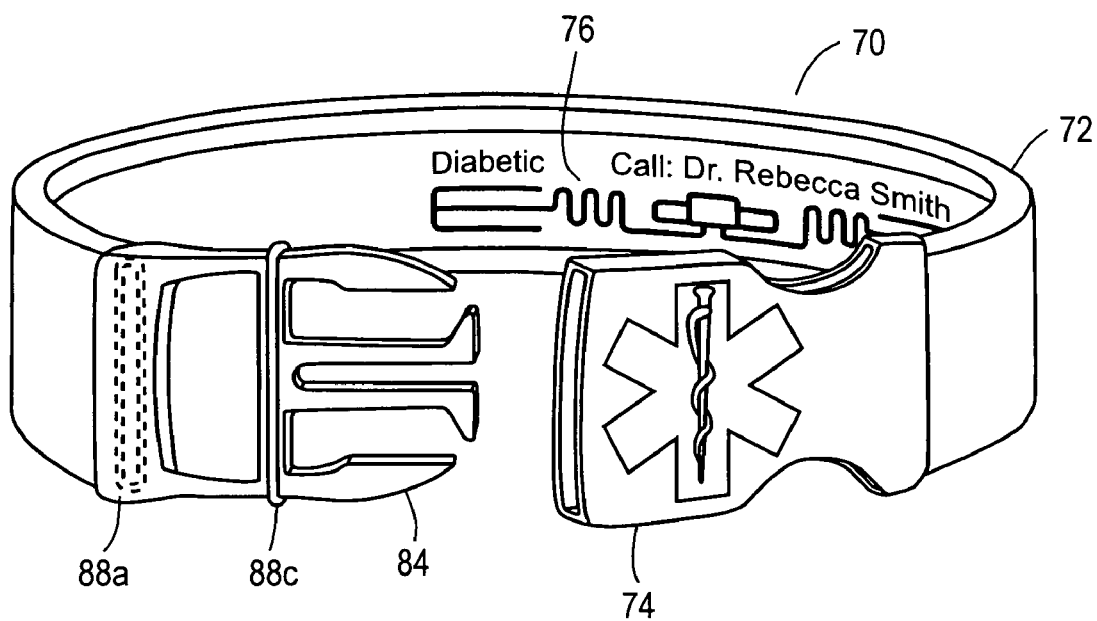
FIG. 6A is a perspective view of the identification band of FIG. 6 with o-rings in accordance with one embodiment of the invention.

FIG. 6A shows the identification band 70 with three o-rings, a first o-ring 88*a* and a second o-ring 88*b* located on the male closure element 84.

Figure 7B:
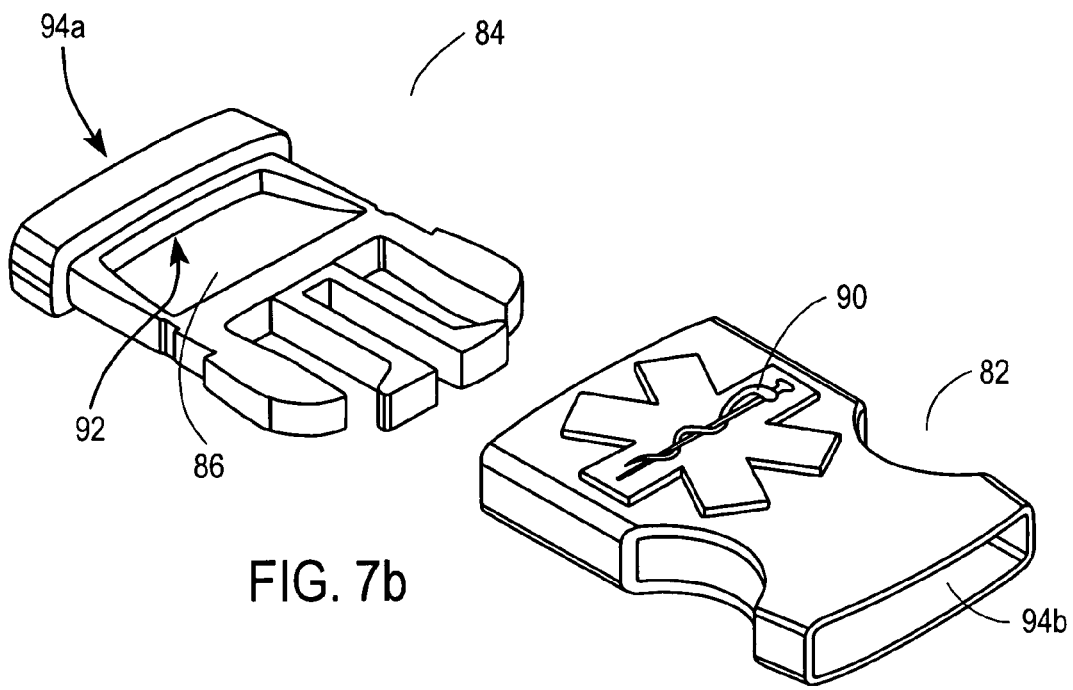
FIG. 7B is a detailed perspective view of the clasp of the identification band of FIG. 7A in accordance with one embodiment of the invention.
Figure 7A:
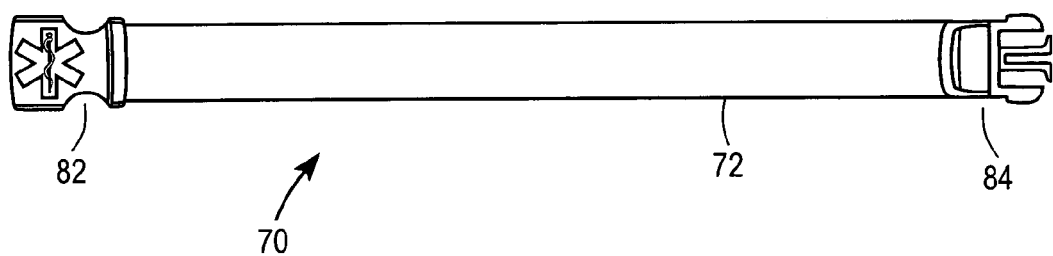
FIG. 7A is a side view of the identification band of FIG. 6 in an unclasped position in accordance with one embodiment of the invention.

FIGS. 7A and 7B show the identification band 70 in more detail.

The male closure element 84 includes an opening 92 for receiving the information tag 76. The information tag is insertable into the opening 92, guided by the guide 86 and into the opening (not shown) in the band 72. The male closure element 84 is insertable into the female closure element 82.

Each of the male and female closure elements 84 and 82, respectively, include openings 94*a-b*. Openings 94*a-b* correspond with the band 72 for receiving opposing ends of the band 72.

Figure 8A:
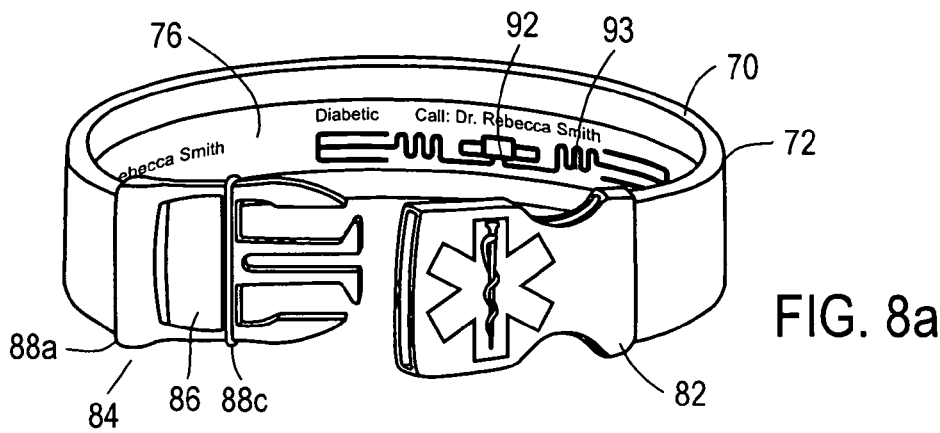
FIG. 8A is a perspective view of the identification band of FIG. 6 with an RFID tag in accordance with one embodiment of the invention.
Figure 8B:
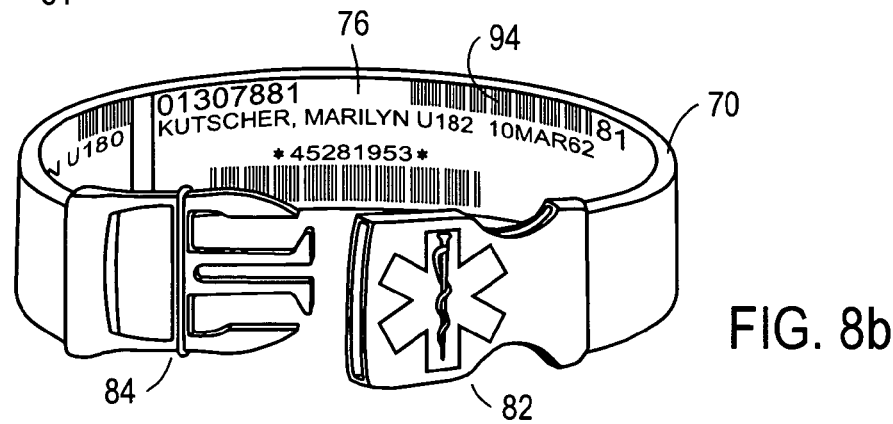
FIG. 8B is a perspective view of the identification band of FIG. 6 with a bar code in accordance with one embodiment of the invention.
Figure 8C:
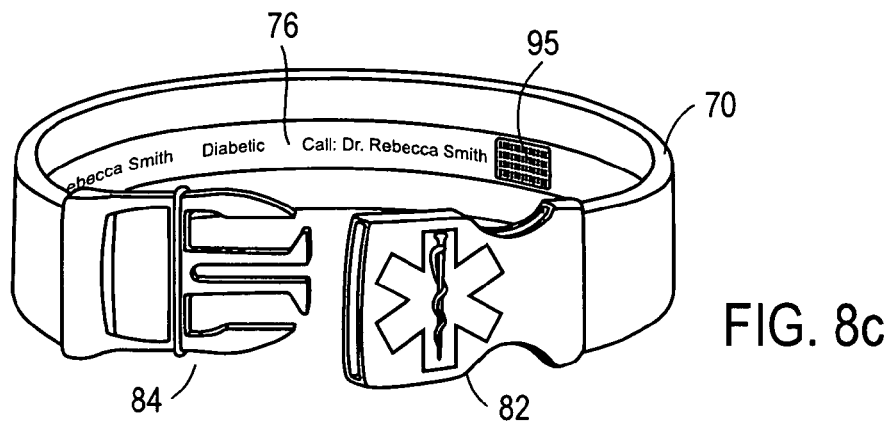
FIG. 8C is a perspective view of the identification band of FIG. 6 with a chip in accordance with one embodiment of the invention.
Figure 8D:
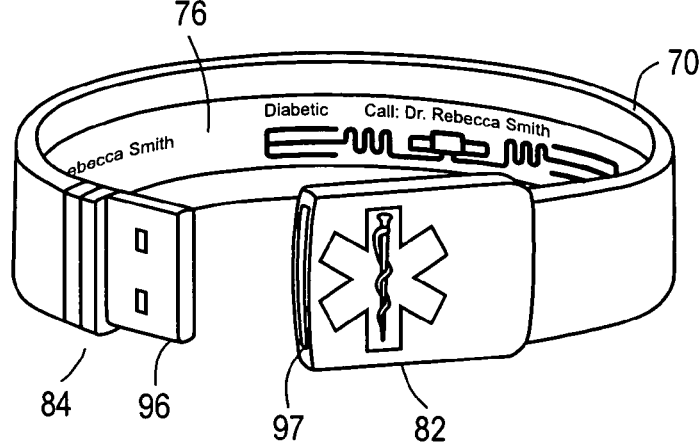
FIG. 8D is a perspective view of the identification band of FIG. 6 with a USB port in accordance with one embodiment of the invention.

FIGS. 8A-8D show the identification band 70 with digital data storage capabilities. FIG. 8A shows the identification band 70 with an identification tag 76 having an RFID tag. The RFID tag includes a chip 92 and an antennae 93. FIG. 8B shows the identification band 70 with a bar code 94. FIG. 8C shows the identification tag 76 having a chip 95. The information stored on the chip may be accessible through a magnetic swipe (not shown). FIG. 8D shows the identification band with a USB port 96. In the illustrated embodiment, the USB port 96 is used as the male closure element 84 and the female closure element 82 includes an opening 97 that is engageable with the USB port 96.

In use, a wearer of the identification band 70 identifies their medical conditions and/or contact information on the information tag 76. The wearer unlocks the closure device 74 by releasing the male closure element 84 from the female closure element 82. The information tag 76 is inserted into the opening 92 until the information tag 76 is entirely inserted into the band 72. A wearer then secures the identification band 70 to their wrist. The male closure element 84 is reinserted into the female closure element 82 until the male closure element 84 is secured in place.

In the illustrated embodiments, the medical information is visible through the inner surface 76 of the band 72. A first responder can remove the identification band 70 or rotate the band 72 to visualize the medical information on the information tag 76.

Figure 9:
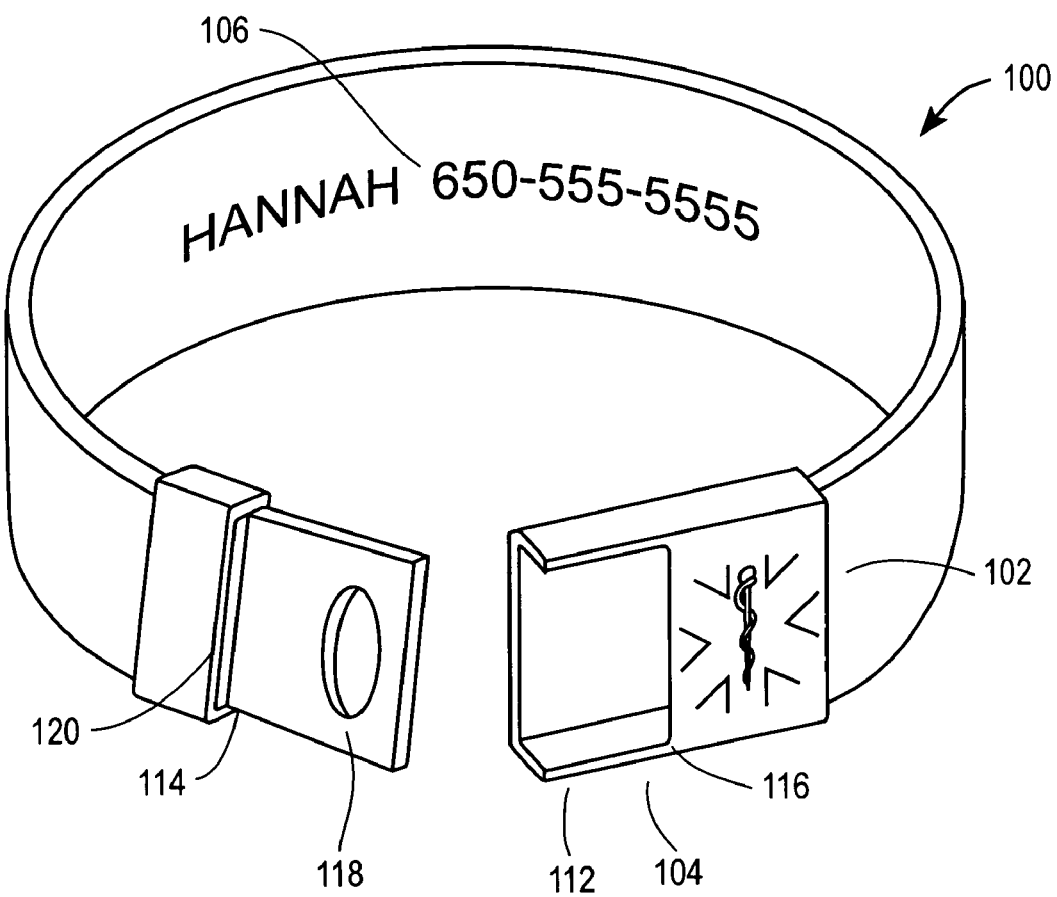
FIG. 9 is a perspective view of an identification band in accordance with one embodiment of the invention.

FIG. 9 shows an identification band 100 in accordance with one embodiment of the invention. The identification band 100 includes a band 102, a closure device 104 and an information tag 106. The band 102 includes an outer surface 108 and an inner surface 110. The band 102 also includes an opening (not shown) throughout the length of the band 102.

As discussed above with reference to identification band 100 illustrated in FIGS. 1 and 2, one or more of the outer surface 108 and inner surface 110 may be transparent, and the information tag 106 is insertable into the band 102, such that information provided on the information tag 106 is visible through the one or more transparent surfaces.

The closure device 104 includes a female closure element 112 and a male closure element 114. The female closure element 112 includes an opening 116. The male closure element 114 includes a first opening 118 and a second opening 120. The second opening corresponds to the information tag 106.

The male closure element 114 is insertable into the female closure element 112. The information tag 106 is insertable into the opening 120, such that the information tag 106 is visible through the band 102.

Figure 10:
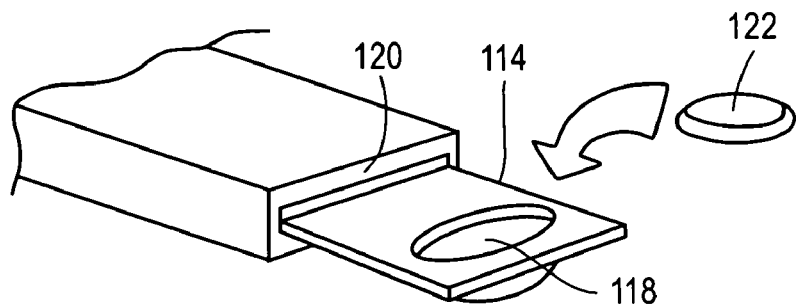
FIG. 10 is a detailed view of one end of the identification band of FIG. 9 in accordance with one embodiment of the invention.

FIG. 10 shows the male closure element 112 in more detail. A pill 122 is insertable into the opening 118.

In use, a wearer of the identification band 100 identifies their medical conditions and/or contact information on the information tag 106. The wearer unlocks the closure device 104 by releasing the male closure element 114 from the female closure element 112. The information tag 106 is inserted into the opening 120 until the information tag 106 is entirely inserted into the band 102. A pill 122, or other type of medication, may be placed in the opening 122. A wearer then secures the identification band 100 to their wrist. The male closure element 114 is reinserted into the female closure element 112 until the male closure element 114 is secured in place.

In the illustrated embodiments, the information is visible through the inner surface 106 of the band 102. A first responder can remove the identification band 100 or rotate the band 102 to visualize the information on the information tag 106. The first responder can also administer the pill 122, or other medication, to the wearer of the identification band 100.

FIG. 11 shows an identification band 130 in accordance with one embodiment of the invention. The identification band 130 includes a band 132 and a closure and storage device 134.

The closure and storage device 134 includes a storage element 136, a moveable lock 138, a locking element 140 and a base 142.

The band 132 includes a plurality of openings 144.

FIG. 12 shows the closure and storage device 134 in more detail. The storage element 136 is moveable.

As discussed above, the band includes a plurality of openings 144. The base 142 of the closure and storage device 134 includes first and second protrusions 146a,b.

The protrusions 146 are insertable into the openings 144 in the band 132. The closure and storage device 134 secures the band 132 in place by securing the storage element 136 to the base 142.

FIG. 13 shows the closure and storage device 134 in more detail. The moveable lock 138 slides off of the storage element 136. The storage element 136 includes an opening 148 for receiving an information tag 150. The information tag 150 is inserted into the opening 148 in the storage element 136.

In use, a wearer of the identification band 130 identifies their medical conditions and/or contact information on the information tag 150. The wearer releases the moveable lock 138 by sliding the movable lock 138 relative to the storage element 136. The information tag 150 is inserted into the opening 148 in the storage element 136. The moveable lock 138 is then slid back over the opening 138 to lock the information tag 150 in the storage element 136.

A wearer secures the identification band 130 to their wrist. The storage element 136 is released from the base 142. The protrusions 146 are inserted into the openings 144 to fit the wearer's wrist. The storage element 136 is secured to the base 142.

In the illustrated embodiments, a first responder can remove the lock 138 is the information tag 150.

FIG. 14 shows the identification band 130 with a decorative aspect. The band 132 includes an attachment element 150 for receiving a decorative element 152. The attachment element 150 is secured to the band 132 and includes a locking element 154.

FIG. 15 shows the attachment element 150 in more detail. The decorative element 152 includes a guide 156 having a projection 158. The projection 158 corresponds to the locking element 154.

The projection 158 is inserted into the locking element 154 and the guide is slid in the locking element 154 until the decorative element 152 is secured in place.

The decorative aspect may be one or more charms. The charms may be purely decorative or partially decorative but utilitarian and contain technology, such as a SIMM card or battery.

FIG. 16 shows the identification band 130 with a decorative aspect. The band 132 includes a plurality of openings 160.

FIG. 17 shows the decorative aspect in more detail. A decorative element 162 having a protrusion 164 is insertable into the openings 160 of the band 132. The decorative element 162 snaps into the openings 160.

FIG. 18 shows an identification band 180 in accordance with one embodiment of the invention. The identification band 180 includes a band 182, a closure device 184 and a moveable storage device 186.

The closure device 184 includes a first, stationary closure element 188, a second, moveable closure element 190, and a button 192. The first, stationary closure element 188 includes a projection 194.

The band 182 includes a plurality of openings 196.

1 The projection 194 is insertable into one of the plurality of openings 196 to adjust the size of the band 182. The second element 190 is secured over the first closure element 188 and projection to secure the band 182.

The second closure element 190 is openable with the button 192. A digital data storage device may be stored within the closure element 192. Digital data including medical information about the wearer may be provided within the closure element 192.

The moveable storage device 186 includes first and second slides 198 for slideably securing the storage device 186 to the band 182. Written or typed medical information is storable in the storage device 186.

FIG. 19 shows the storage device 186 in more detail. The storage device 186 includes a storage component 200 and a movable lock 202. The storage component receives an information tag 204. The moveable lock 202 can be slid away from the storage component 200, such that the information tag 204 can be inserted into the storage component 200. The information tag 204 is typically a strip of paper with written or typed medical information.

In use, a wearer of the identification band 180 identifies their medical conditions and/or contact information on the information tag 204. The wearer also typically stores medical information in a digital data storage device which can be provided with the identification band 180. The wearer inserts the written information on the information tag 204 into the storage device 186 as discussed above. The wearer also inserts the digital data storage device 180 into the closure component 190, as discussed above.

A wearer secures the identification band 180 to their wrist. The closure component 190 is released from closure component 188. The openings 196 in the band 182 are attached to the projection 194, as desired by the user. The closure component 190 is then secured to the closure component 188 to lock the band 182 in place.

In the illustrated embodiments, the wearer's information is accessible from both the moveable storage device 186 and the moveable closure component 190. A first responder can access written information initially from the storage device 186 and access additional information from the digital data stored in the closure component 190.

Each of the wearable identification bands disclosed herein may be designed to be worn by young children. The wearable band may include child-safe features, such as, for example, water-resistance, monolithic construction so that there are no pieces that may break off of the device, a child-proof clasp that is difficult for a child to open, adjustability, and non-toxic materials.

The band may include a replaceable and/or customizable skin that can be attached to the outside of the band. The replaceable skin may come in different colors, patterns, materials and/or designs.

The band can be made in various sizes, colors, materials and different combinations thereof.

The closure device and/or band can be plain, textured and/or include designs.

The closure devices disclosed herein may be any type of closure device, such as, for example, push-button, locket, friction, permanent, etc, or a buckle, such as, for example, a center push buckle, a side push buckle, a cap buckle, a living hinge buckle, secure seal (permanence) and the like.

The closure devices may be formed of any type of sturdy plastic or metal or combination of metal and plastic—coated or otherwise. Alternatives for the clasp include Velcro, a tension pull device for tightening the band, or a peg/hook, secure seal, hole-watch band type of clasp. A more permanent form of closure may be created using magnets on the clasp or, the closure device may include a one time only usage element that must be broken to remove the band. These alternatives have the further advantage of allowing for the size of the band to be adjusted and/or prevent removal. Other types of closure devices apparent to those of skill in the art may also be used.

The strip of paper on which the wearer's information can be printed, typed or written may be a waterproof paper. The strip of paper may be provided along with the wearable band when purchased. The strip of paper may come in a roll of paper that may be cut to size or may come as one or more precut strips of paper sized to fit within the hollow of the band.

The information that is placed onto the information tag may be entered into a computer program (application and/or web site) that sizes or limits the information and the number of characters of the information so that the data fits onto the strip of paper. The computer program may be programmed to account for different sized bands and may print the information in the appropriate size and shape to fit the information on the strip of paper or on a piece of paper to be cut to the proper size to fit within the hollow of the band. The computer program may be available on a CD provided with the wearable band when it is sold or may be downloadable from a website or on a website accessible to users of the wearable band. The information tag may include microfiche.

The information may be entered by a caretaker, a parent, or a wearer of the band. In another embodiment, the strip of paper may be preprinted to contain a barcode or other type of image that may be scanned to obtain information on the wearer from a database. In yet another embodiment, the paper may include swipe technology, a bar code, technology for an RFID device, a SIMM chip and a battery, and the like. Technology, such as an RFID antenna and chip (tag) may also be placed within the hollow or band/clasp by other means.

Readable and/or digital data may be included in the identification band to enable quick and efficient access to information about the wearer of the identification band.

The information may be stored in a memory chip (such as the Verichip by Applied Digital Solutions) or flash memory or other forms of data storage. The data stored in the ID may be exported using a USB port.

In another embodiment, the information may be downloadable from wireless capabilities embedded into the band using Radio Frequency Identification (RFID) technology. In this embodiment the RFID chip may be added to the wearable band and or clasp alone or in combination with an antenna. If used alone the information stored within the RFID chip would be downloadable/scannable only when in close proximity to the wearable band, which may be valuable if the information stored is private and a wearer would not want others to be able to access such information from a remote source. But, if the RFID chip contained an identification code or was to be used to locate the wearer, then an antenna would be valuable for accessibility to the information.

The digital information may also be stored within the wearable band in magnetic form (magnetic swipe). It will be appreciated that any of these technologies containing digital user information or a user ID code to access a wearer's information from a database may be placed within the housing of the clasp or within the band itself. The clasp and/or band may include active technology and GSA/M/hybrid/IR technology, flash memory and batteries. The data may be accessible from the ID or an associated database. The digital data storage may include an LED or an LED display, in the band for example. The digital data storage may include a chip/battery. The digital data storage may include audio recording and playback functionality. The wearable band may be designed so that information may be downloaded from a microchip/memory chip embedded or attached to the band or clasp using WIFI IR and/or standard technology. In another embodiment, there will also be available a A-GPS/U-TDOA OR HYBRID system (or other similar systems) that can alert others about the wearer's location in the wearable band.

Any of these technologies containing digital wearer information may be add-ons to the wearable band, meaning that they may be added to the wearable band by a wearer, licensee or a medical provider, for example.

It will be appreciated that digital data storage may be incorporated with any of the identification bands described herein.

It will be appreciated that although the identification bands disclosed herein have been described with respect to medical information, any information about the wearer may be provided by the identification band. For example, the band may include non-medical information, such as a parent's contact information and/or a child's address and phone number in case the child becomes lost. In addition, the wearable band may be used as a collar for pet (e.g., dog or cat collar).

In an alternate embodiment the band may open along its length by a zip-lock type device. In this embodiment the information tag may be inserted into the band and then zipped closed by a slide type of device that fits into the clasp or by applying pressure with fingers.

In yet another alternate embodiment the hollow section of the band may peal open by a zip-lock type device. In this embodiment the information tag may be inserted into the band and then zipped closed by applying pressure with fingers.

The identification band may also include one or more gaskets to ensure a water-tight seal.

The closure device may include teeth, barbs or other gripping devices to ensure the band is securably coupled with the closure device. Alternatively or in addition to the gripping devices, glue or other adhesives may be used to ensure the band is securably coupled with the closure device.

The identification band of the present invention is advantageous because it is updateable, customizable, pragmatic, attractive and functional for all age groups. It can be made in a variety of sizes, colors and materials. In addition, the technology expands its usage and capabilities.

Discrepancies in data can be avoided. The band can be used by healthcare providers, insurance companies, software companies and the like to improve patient care, avoid harmful drug interactions and the like to meet FDA regulations. For example, the band may include a bar code which provides information about drugs the patient is currently taking, so that harmful drug interactions can be avoided.

Caregivers or users can, therefore, quickly and efficiently, update information without errors. In addition, first responders can quickly identify the information quickly without opening or removing the identification band.

The foregoing description with attached drawings is only illustrative of possible embodiments of the described method and should only be construed as such. Other persons of ordinary skill in the art will realize that many other specific embodiments are possible that fall within the scope and spirit of the present idea. The scope of the invention is indicated by the following claims rather than by the foregoing description. Any and all modifications which come within the meaning and range of equivalency of the following claims are to be considered within their scope.

The invention claimed is:

1. An identification band comprising:
   a band having an opening therein, a first end and a second end, at least one surface of the band being transparent;
   a closure device having a first part and a second part, the first part coupled to the first end of the band and the second part coupled to the second end of the band, the second part having a tongue and a moveable lock, the first part having a first opening engageable with the opening of the band and a second opening engageable with the tongue of the second part and the moveable lock moveable to releasably lock the second part to the first part to secure the first end of the band with the second end of the band; and
   an information tag insertable into the opening of the band through the opening in the first part of the closure device, the information tag being visible through the transparent surface of the band.

2. The identification band of claim 1, wherein the information tag comprises a strip of paper viewable from the band.

3. The identification band of claim 1, further comprising a digital data storage element.

4. The identification band of claim 3, further comprising a power supply connectable with the digital data storage element.

5. The identification band of claim 1, wherein the closure device comprises one or more o-rings or gaskets to ensure a water-tight seal.

6. The identification band of claim 1, wherein the first part and the second part of the closure device form a water-tight seal.

7. The identification band of claim 1, wherein the closure device comprises a medication holder.

8. The identification band of claim 1, wherein the information tag is replaceable.

9. The identification band of claim 1, wherein the information tag comprises a bar code to store digital data.

10. The identification band of claim 1, wherein the closure device comprises a USB port.

11. An identification band comprising:
    a band securable to a wearer, the band having an opening therein and a first end and a second end and being at least partially transparent;
    an information tag insertable into the opening to provide written or typed data about the wearer of the band;
    a closure device comprising a first part and a second part, the first part coupled to the first end of the band and the second part coupled to the second end of the band, the second part having a tongue and a moveable lock, the first part having a first opening engageable with the opening of the band and a second opening engageable with the tongue of the second part and the moveable lock moveable to releasably lock the second part to the first part to secure the first end of the band with the second end of the band; and
    a digital data storage element to provide digital data about the wearer of the band.

12. The identification band of claim 11, further comprising providing a second digital data storage element on the information tag.

13. The identification band of claim 12, wherein is the digital data storage element comprises a bar code.

14. The identification band of claim 12, wherein the digital data storage element comprises a chip or an RFID tag.

15. The identification band of claim 14, wherein the RFID tag comprises a chip and an antennae.

16. The identification band of claim 11, wherein the digital data storage element comprises a cable.

17. The identification band of claim 11, wherein the digital data element comprises a USB port.

18. The identification band of claim 11, wherein the closure device is a water-resistant seal.

19. A kit comprising:
    an information tag; and
    an identification band securable to a wearer, the identification band comprising a band having an opening for receiving the information tag, at least one surface of the band being transparent such that the information tag is visible through the at least one surface of the band upon insertion, and comprising a closure device having a first part and a second part, the first part coupled to the first end of the band and the second part coupled to the second end of the band, the second part having a tongue and a moveable lock, the first part having a first opening engageable with the opening of the band and a second opening engageable with the tongue of the second part and the moveable lock moveable to releasably lock the second part to the first part to secure the first end of the band with the second end of the band.

20. The kit of claim 19, wherein the information tag comprises a strip of customizable paper sized to fit within the identification band.

21. The kit of claim 20, wherein the information tag comprises a plurality of strips of paper.

22. The kit of claim 19, wherein the information tag comprises a roll of paper, the width of the roll of paper sized to fit within the identification band.

23. The kit of claim 19, wherein the information tag comprises a bar code to store digital data.

* * * * *